United States Patent [19]
Burgkhardt et al.

[11] 3,878,108
[45] Apr. 15, 1975

[54] DOSIMETER TO BE WORN ON A FINGER

[75] Inventors: Bertram Burgkhardt, Karlsruhe; Ernst Piesch, Leopoldshafen; Heinz Schrodt, Karlsruhe; Klaas Buijs, Karlsruhe; Johannes Pieter Vaane, Karlsruhe, all of Germany

[73] Assignee: Gesellschaft fur Kernforschung mbH, Karlsruhe, Germany

[22] Filed: June 1, 1973

[21] Appl. No.: 366,109

[30] Foreign Application Priority Data
June 14, 1972  Germany.............................. 2228871

[52] U.S. Cl................................. 250/472; 250/473
[51] Int. Cl. ............................................... G01t 5/00
[58] Field of Search........................... 250/472, 473

[56] References Cited
UNITED STATES PATENTS
| | | | |
|---|---|---|---|
| 3,335,278 | 8/1967 | Price et al........................... | 250/473 |
| 3,418,472 | 12/1968 | Evans................................. | 250/473 |
| 3,505,523 | 4/1970 | Becker............................... | 250/473 |

*Primary Examiner*—Archie R. Borchelt
*Attorney, Agent, or Firm*—Spencer & Kaye

[57] ABSTRACT

For the purpose of accurately measuring the radioactive radiation to which the hand of a person is exposed, there is provided a dosimeter that includes a casing having an arcuate shape conforming to the circumferential contour of a person's finger. In the casing there is situated a stack of foils including at least one fission foil and at least one detector foil for detecting fission fragments leaving the fission foil.

11 Claims, 3 Drawing Figures

PATENTED APR 15 1975  3,878,108
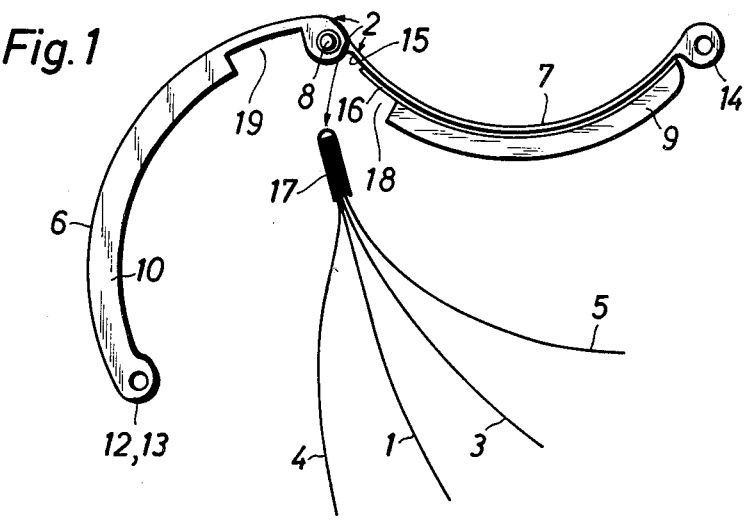
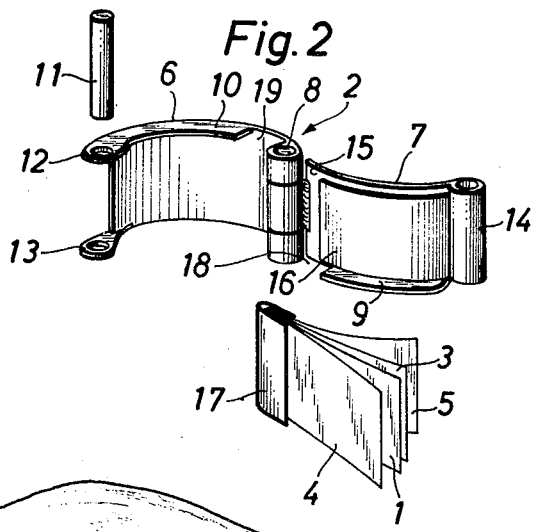
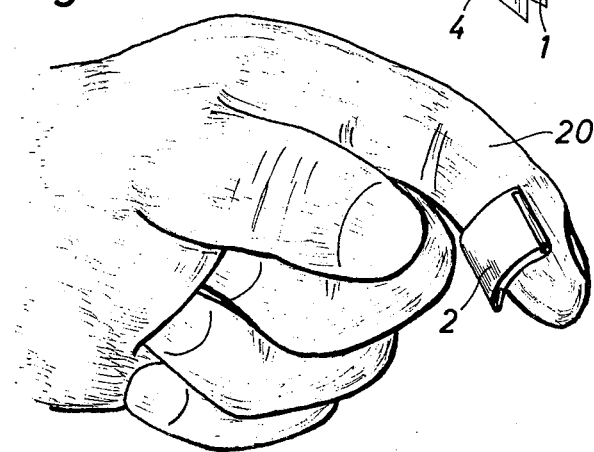

DOSIMETER TO BE WORN ON A FINGER

BACKGROUND OF THE INVENTION

The present invention relates to a dosimeter which can be worn by a person exposed to radiation.

In recent years, major quantities of spontaneously fissioning nuclides have become available in many radiochemistry laboratories. The handling of these materials requires a measurement of the neutron dose. The experience made in laboratories with respect to work with, e.g., $Cm^{244}$ and $Cf^{252}$ shows that especially the dose received by the hands must be monitored. Due to the short distance to the material, previous calculation or even measurement of the dose rate will result in major errors, thus requiring a direct measurement to be made during the work proper.

This problem cannot be solved with nuclear emulsions used for personnel dosimetry because of the gamma sensitivity and the unfavorable size of the film. The use of gamma dosimeters only, e.g., lithium fluoride dosimeters, is not possible either because the ratio between the gamma dose and the neutron dose decisively depends on the distance relative to the source and on the shielding. The use of detectors for the detection of fast neutrons appears to be more promising.

Neutrons can be detected, above all, by non-photographic nuclear track detectors, such as fissile material in contact with a plastic foil in which the neutron induced fission fragments are recorded. Of all the possible $(n,f)$-reactions in $Th^{232}$, $NP^{237}$, and $U^{238}$, $NP^{237}$ shows the most favorable threshold at a neutron energy of 0.75 MeV. However, neptunium metal is not available, and the use of electrolytically deposited $NpO_2$ coatings makes the dosimeter relatively insensitive for routine monitoring purposes. By contrast, thorium and uranium metal are available as tinfoils (threshold values 1.2 MeV and 1.5 MeV, respectively). However, $U^{238}$ has a relatively high rate of spontaneous decay, which gives rise to a background dose of 450 rem/month. If the disadvantages of a high background dose in the case of uranium can be accepted, depleted uranium may be used for the simultaneous detection of intermediate and fast neutrons, the isotopic composition of depleted uranium allowing an indication of the correct dose of fast and thermal neutrons. In addition to detectors using fissile material, also a polycarbonate foil is able to detect neutrons above 1 MeV through neutron induced recoil nuclei and $(n,\alpha)$-reactions. However, these detectors do not lend themselves to automatic counting in a spark counter.

Since a sensitivity of detecting of 100 mrem is desired for routine monitoring purposes, both automatic counting methods, e.g., electrical discharge in a spark counter, or optical counting on a TV screen (gain in sensitivity by a factor of 100 due for the counting of larger areas) must be used for track measurement and relatively thick layers of metal must be employed (gain in sensitivity by a factor of 10). Activation detectors in the range of energy of thermal and intermediate neutrons, such as gold, cannot be used because of the short halflives. Lithium fluoride dosimeters may be used in this case also to detect thermal neutrons.

Given the right isotopic composition of a lithium dosimeter of $Li^7$ and a small fraction of $Li^{6,}$ as in phosphate glasses with a low sensitivity to neutrons, the best result that could be achieved would be an indication of the true dose of thermal neutrons and gamma radiation. Measuring only thermal and intermediate neutrons generated in the glove box due to moderation and backscattering from the walls is not a suitable method of measuring the overall dose, because in this way the relatively high dose of fast neutrons in the immediate vicinity of the source will not be taken into account. Greater promise seems to be offered by the Albedo dosimetry principle with a dosimeter worn on the wrist. This would achieve sufficient sensitivity to fast neutrons, but one would have to accept the oversensitivity to intermediate neutrons.

SUMMARY OF THE INVENTION

The present invention serves the purpose of creating a neutron finger dosimeter suitable for routine application with an intended limit of detection of 100 mrem.

In the present invention, this problem is solved in that the casing of the dosimeter has a shape adapted to the circumferential contour of a finger, the casing contains one or more fission foils with a shape adapted to the wall of the casing opposite the finger, and one or more detector foils for the detection of the fission fragments emanating from the fission foil stacked above each other.

In one embodiment of the present invention, the casing has the shape of one portion of a circular cylinder, the casing consisting of two halves coupled with each other by a joint, e.g., a hinge joint, the two halves when coupled together leaving a space inside to accommodate the fission and detector foils, and the casing can be locked.

In another embodiment of the present invention, the casing has the shape of a ring consisting of two halves which can be joined and then generate a space inside for accommodation of the fission and detector foils.

In one advanced embodiment of the present invention, the fission foil is a flexible thorium or neptunium plate surrounded on one or both sides by one or more flexible stacked detector foils, e.g. foils made of Macrofol, of the same or different thicknesses. Macrofol is a trademark owned by the German firm Bayer of Leverkusen and designates a polycarbonate resin. The fission and detector foils in this case can be retained by a clamp at one common edge which clamp can be inserted into the inner space of the casing and can be arrested.

The shapes and dimensions of the dosimeter according to the present invention are adapted to practical requirements. Thus, the detector holder does not impair the movability of the finger on which it is worn, allows the foils to be exchanged without any difficulty, protects the foils from damage, and ensures continuous close contact between the foils and the fission foil.

BRIEF DESCRIPTION OF THE DRAWINGS

FIG. 1 is a top plan view of a preferred embodiment of the invention, shown in an open position.

FIG. 2 is an exploded perspective view of the same embodiment in an open position.

FIG. 3 is a perspective view of the same embodiment in a closed position, attached to a finger of the user.

DESCRIPTION OF THE PREFERRED EMBODIMENT

For converting the neutrons into an equivalent dose, the first-collision dose must be used as a basis because of the low mass of the hand, not the multi-collision dose commonly used in whole body dosimetry. The quality factor used is $Q = 3$ for thermal and intermediate neutrons and $Q = 10$ for fast neutrons. For the equivalent dose of 1 rem, the fluences shown in the Table will result.

| Energy range | Spectrum | NEUTRON FLUENCE FOR | |
|---|---|---|---|
| | | Energy dose n/cm² per 1 rad | Equivalent dose n/cm² per 1 rem |
| Thermal neutrons | Maxwellian distribution <0.5 eV | $5.0 \times 10^{10}$ | $1.67 \times 10^{10}$ |
| Intermediate neutrons | 1/E spectrum 0.5 eV to 0.75 MeV | $3.9 \times 10^{9}$ | $1.3 \times 10^{9}$ |
| Fast neutrons | Fission spectrum >0.75 MeV | $3.3 \times 10^{8}$ | $3.3 \times 10^{7}$ |

The neutron equivalent dose on the fingers can be determined by measurements using neptunium ($> 0.75$ MeV) or thorium ($> 1.2$ MeV) as a detector. Since thorium, contrary to neptunium, is easily available as a tinfoil, a thorium foil has preferably been used as a detector. For evaluation, a correction is required for the range of neutron energies between 0.75 and 1.2 MeV.

In calculating the equivalent dose of fast neutrons, the following calibration factors must be considered if a thorium foil is used in contact with a Macrofol foil:

1. Equivalent dose factor for fast neutrons (fission spectrum $> 0.75$ Mev): $3.3 \times 10^{7}$ m/cm² . rem.

2. Calibration factor for thorium plate ($E > 1.2$ MeV) for microscopic counting and evaluation in a spark counter, respectively: $1.4 \times 10^{-6}$ tracks/neutron and $0.65 \times 10^{-6}$ holes/neutron, respectively.

3. Correction factor taking into account the neutron fraction in the energy range between 0.75 and 1.2 MeV, referred to a $^{252}$Cf spectrum D ($> 0.75$ MeV) corresponding to $1.75 \times D$ ($> 1.2$ MeV).

In calculating the equivalent dose, 13 holes/cm² . rem is obtained from the counting rate of the spark counter evaluation, taking into account the factors quoted for a thorium detector. This value is in good agreement with data according to which 40 tracks/cm² . rem was found for an accident dosimeter on the basis of the multi-collision dose.

In FIG. 1 one embodiment of the dosimeter according to the present invention is described. The detector and the fission foil 1, respectively, for the neutron finger dosimeter 2 as developed is a thorium foil of 0.125 mm thickness and an area of 2 cm² both sides of which are covered with a Macrofol foil 3 and 4 of 0.012 mm and 0.3 mm thickness, respectively, for detection of the neutron induced fission fragments. The thinner Macrofol foil 3 is used for routine measurement of lower doses in the spark counter (not shown in detail), the thicker foil 4 can be counted under the microscope for higher doses. The thin foil 3 is covered with another Macrofol foil 5 of 0.3 mm thickness to avoid damage; if necessary, this additional Macrofol foil can be used also to detect neutron induced recoil nuclei.

In FIG. 1, the dosimeter 2 is shown in the opened condition and the fission foil 1 (also several fission foils may be arranged side by side or one above the other) and the detector foils 3 to 5 have been removed from the detector casing. The dosimeter holder which is curved and has the shape of one portion of a circular cylinder and is adapted to the contour of a finger, consist of two halves 6 and 7 made of steel plate 0.5 mm thick. Both halves 6 and 7 are joined by a hinge joint 8 and may be pivoted into a closed position in which the two halves 6 and 7 extend in a parallel, superposed relationship. When in a closed position, an inner space is formed which is defined by the two halves 6 and 7 and by one side wall 9 and 10 each in one half 6 and 7 respectively. The fission and detector foils 1, 3, 4 and 5, which are flexible, can be inserted into this clearance or inner space. As best seen in FIG. 2, the dosimeter 2 is closed on the side opposite the hinge joint 8 by means of a pin 11 which can be passed through two eyelets 12, 13 of the half 6 and a hollow cylinder 14 attached to the half 7.

The inner wall 15 of the half 7, which rests upon the finger shown only in FIG. 3, additionally carries a lead foil 16 of 0.2 mm thickness for better shielding of the gamma radiation emitted by the thorium plate 1.

The fission and detector foils 1, 3, 4 and 5 are retained at one end by a spring clamp 17 and inserted into the casing 6, 7 as a combined unit. This greatly facilitates the insertion and removal of the foils 1, 3, 4 and 5 and ensures close contact of the Macrofol foils 3 to 5 with the fission foil 1 in the closed holder.

FIG. 2 shows the same dosimeter in a three-dimensional representation, featuring especially the locking mechanism with the pin 11, the eyes 12, 13 and the hollow cylinder 14 and the hinge joint 8. Moreover, the side walls 9 and 10 carry a recess 18 and 19 (see FIG. 1) on the side facing the hinge joint, which recess accommodates the clamp 17. The dimensions of the clamp 17 are such that its width slightly exceeds the width of the foils 1, 3, 4 and 5, causing it to protrude slightly. The protruding parts can then be arrested in the recesses 18 and 19 when the dosimeter is closed.

The dosimeter 2 according to FIGS. 1 and 2 may also be shaped like a ring, which ring again consists of two halves which can be joined. The two halves can then constitute a closed space or only partial spaces into which foils corresponding to the foils 1, 3, 4 and 5 in FIGS. 1 and 2 can be placed. The upper half can be designed to accommodate a $\gamma$-dosimeter, for instance, a LiF-dosimeter of $3 \times 3 \times 1$ mm³ size. This ring can then be slipped over a finger of the human hand.

The finger dosimeter 2 as represented in FIGS. 1 and 2 can be put on the lower surface of a finger, as is shown in FIG. 3. A glove (not shown) is then slipped over the dosimeter 2 and the finger or the entire hand, thus causing the dosimeter 2 to remain in close contact with the finger while the wearer works.

Also detector combinations other than thorium may be placed into the dosimeter which would allow additional information to be gained about the neutron spectrum, especially at high doses. One possible detector arrangement in addition contains Np$^{237}$ and, if desired, U$^{235}$ each of which can be electrolytically deposited on one side of a gold foil. After incidents, the gold activation as well may be used for the detection of thermal and intermediate neutrons.

The lowest detectable dose is determined by the background count rate. On the basis of the spontaneous fission rate of Th$^{232}$, approximately 0.02 tracks/cm² must be expected within a period of about two weeks. A two-week exposure of five thorium and uranium foils each showed the following results when counted in a spark counter:

Macrofol foil unirradiated: 0 holes/cm²

Macrofol foil in contact with Th plate: 0 holes/cm$^2$

Macrofol foil in contact with U plate (depleted): 4.6 holes/cm$^2$.

This results in a lowest detectable dose for a detector foil of 2 cm$^2$ and two weeks of wearing period of 80 mrem for thorium and 240 mrem for uranium. The maximum track density still measurable with automatic evaluation in a spark counter and with microscopic scanning corresponds to an equivalent dose of 200 rem and 880 rem, respectively. The gamma radiation emitted by thorium results in a dose rate of 1.3 mR/h on the surface of the finger dosimeter 2. If the dosimeter is worn for 10 hours a week, this corresponds to a finger dose of 13 mrem. The detection of fission fragments depends on the direction of radiation incidence. The bent shape of the finger dosimeter 2 reduces this influence to less than 20%.

We claim:

1. A dosimeter to be worn on one finger of a person, comprising in combination:
    a. a casing of arcuate shape for conforming to the contour of a person's finger in the circumferential direction thereof, a wall forming part of said casing, said wall having an outer face for contacting a person's finger, said wall having an inner face extending substantially parallel with said outer face; and
    b. a stack of foils disposed in said casing and conforming to said inner face of said wall, said stack including at least one fission foil and at least one detector foil for detecting fission fragments leaving said fission foil.

2. A dosimeter as defined in claim 1, said casing including
    a. two arcuate complemental casing halves, each having a first end and a second end;
    b. hinge means for pivotally joining said casing halves at their said first ends; said casing halves being pivotable into an open position and into a closed position in which said casing halves extend in a parallel, superposed relationship;
    c. means defining an inner space in the closed position of said casing halves, said inner space accommodating said stack of foils; and
    d. locking means for interconnecting said second ends of said casing halves in the closed position for preventing said casing halves from assuming said open position.

3. A dosimeter as defined in claim 2, said locking means including
    a. means defining aligned, spaced eyelets on said second end of one of said casing halves;
    b. a hollow cylindrical member affixed to said second end of the other of said casing halves; said hollow cylindrical member being disposed between and aligned with said eyelets in the closed position of said casing halves; and
    c. a locking pin extending through said eyelets and said hollow cylindrical member in the closed position of said casing halves.

4. A dosimeter as defined in claim 2, wherein each casing half has the shape of one portion of a circular cylinder.

5. A dosimeter as defined in claim 1, including a clamp attached to an end of said stack for holding said foils together; and means for accommodating said clamp in said casing.

6. A dosimeter as defined in claim 5, including means for immobilizing said clamp in said casing.

7. A dosimeter as defined in claim 1, wherein said foils are flexible.

8. A dosimeter as defined in claim 1, wherein said fission foil is a flexible thorium plate.

9. A dosimeter as defined in claim 1, wherein said fission foil is a flexible neptunium plate.

10. A dosimeter as defined in claim 1, wherein said casing is made of steel.

11. A dosimeter as defined in claim 1, further including a lead foil contacting face-to-face said inner face of said wall.

* * * * *